US012433822B2

(12) United States Patent
Huang et al.

(10) Patent No.: US 12,433,822 B2
(45) Date of Patent: Oct. 7, 2025

(54) CONTROL BOX OF MASSAGE POOL AND MASSAGE POOL

(71) Applicant: BESTWAY INFLATABLES & MATERIAL CORP., Shanghai (CN)

(72) Inventors: Shuiyong Huang, Shanghai (CN); Xianglin Zeng, Shanghai (CN); Jiang Xu, Shanghai (CN); Qingshui Song, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 678 days.

(21) Appl. No.: 17/688,018

(22) Filed: Mar. 7, 2022

(65) Prior Publication Data

US 2022/0280382 A1 Sep. 8, 2022

(30) Foreign Application Priority Data

Mar. 8, 2021 (CN) ......................... 202120489220.0

(51) Int. Cl.
*E04H 4/14* (2006.01)
*A61H 33/00* (2006.01)
(Continued)

(52) U.S. Cl.
CPC ......... *A61H 33/02* (2013.01); *A61H 33/0087* (2013.01); *E04H 4/14* (2013.01); *F16L 41/02* (2013.01); *A61H 2033/022* (2013.01)

(58) Field of Classification Search
CPC .............. A61H 33/02; A61H 2033/022; A61H 33/0087; A61H 2033/0037;
(Continued)

(56) References Cited

U.S. PATENT DOCUMENTS 1,687,860 A * 10/1928 Fosnaugh ........... F04B 53/1087 137/543.13
2,223,699 A * 12/1940 Norgren .................. F16K 15/06 137/484.2
(Continued)

OTHER PUBLICATIONS

Extended European Search Report dated Sep. 2, 2022 (Sep. 2, 2022) issued on related European patent application 22159895.6 by the European Patent Office.

*Primary Examiner* — Mark A Laurenzi
*Assistant Examiner* — Benjamin Doyle
(74) *Attorney, Agent, or Firm* — DICKINSON WRIGHT PLLC

(57) ABSTRACT

A control box of a massage pool is provided and includes: a filtering water pump unit, including a filtering pump body, a filtering water inlet pipe connected between the massage pool and the filtering pump body, and a filtering output pipe. The control box further includes a massage pump unit, including a massage pump body, a massage inlet pipe connected between the massage pool and the massage pump body, and a massage output pipe. The control box further includes a water outlet pipe configured to output water to the massage pool, and a three-way connecting pipe fitting. The three-way connecting pipe fitting includes: a first branch pipe having a distal end connected to the filtering output pipe, a second branch pipe having a distal end connected to the massage output pipe, and a third branch pipe having a distal end connected to the water outlet pipe At least one valve is configured to alternately open and close a first flow path from the filtering output pipe through the first branch pipe.

18 Claims, 13 Drawing Sheets

(51) Int. Cl.
*A61H 33/02* (2006.01)
*F16L 41/02* (2006.01)

(58) Field of Classification Search
CPC ............ A61H 2201/0235; A61H 33/00; A61H 33/60; A61H 33/6021; E04H 4/14; F16L 41/02
USPC ................................ 417/2; 285/125.1–133.6
See application file for complete search history.

(56) References Cited

U.S. PATENT DOCUMENTS

| | | | | | |
|---|---|---|---|---|---|
| 2,488,086 | A | * | 11/1949 | Kellogg | F16K 31/30 137/450 |
| 2,810,397 | A | * | 10/1957 | Olson | F04B 53/103 137/540.11 |
| 3,441,051 | A | * | 4/1969 | Morse | F16K 15/026 137/516.25 |
| 3,965,926 | A | * | 6/1976 | Buckner | F16K 15/033 137/512.1 |
| 4,043,358 | A | * | 8/1977 | Sliski | F16K 15/038 137/527 |
| 4,535,808 | A | * | 8/1985 | Johanson | F16K 15/063 137/543 |
| 4,546,505 | A | * | 10/1985 | Wakenshaw | A61H 33/02 4/588 |
| 4,761,838 | A | * | 8/1988 | Hargrove | A61H 33/0095 4/514 |
| 4,859,345 | A | * | 8/1989 | Inagaki | C02F 1/02 210/764 |
| 4,893,362 | A | * | 1/1990 | Murphy | A61H 33/0087 4/585 |
| 5,031,255 | A | * | 7/1991 | Hilger | A61H 33/028 4/541.4 |
| 5,135,361 | A | * | 8/1992 | Dion | F04D 15/0072 417/2 |
| 5,287,567 | A | * | 2/1994 | Eash | E04H 4/1209 126/374.1 |
| 5,526,538 | A | * | 6/1996 | Rainwater | A61H 33/601 4/492 |
| 5,546,981 | A | * | 8/1996 | Li | F16K 15/028 137/493.3 |
| 5,899,231 | A | | 5/1999 | Drori | |
| 6,003,166 | A | * | 12/1999 | Hald | A61H 33/6026 4/492 |
| 6,279,177 | B1 | * | 8/2001 | Gloodt | A61H 33/60 4/541.3 |
| 7,060,180 | B1 | * | 6/2006 | Barnes | C02F 1/78 210/97 |
| 7,695,250 | B2 | * | 4/2010 | Johnson | F04C 11/00 184/6.3 |
| 8,230,875 | B2 | * | 7/2012 | Norman | F16K 15/063 137/542 |
| 8,453,275 | B2 | * | 6/2013 | May | A61H 33/005 4/507 |
| 9,573,038 | B1 | * | 2/2017 | Hillyard | A63B 69/125 |
| 9,856,667 | B2 | | 1/2018 | Cox | |
| 11,083,667 | B2 | * | 8/2021 | Hung | B08B 9/0328 |
| 11,554,079 | B2 | * | 1/2023 | Collins | F16K 11/0856 |
| 2002/0029414 | A1 | * | 3/2002 | Shun Lau | A61H 33/0087 4/541.1 |
| 2002/0053106 | A1 | * | 5/2002 | Turner | A61H 33/6052 4/541.1 |
| 2004/0045613 | A1 | | 3/2004 | Hinojosa et al. | |
| 2005/0005349 | A1 | * | 1/2005 | Gardenier | A61H 33/6063 4/541.1 |
| 2007/0036665 | A1 | * | 2/2007 | Paulin | F04D 15/0005 417/435 |
| 2007/0094784 | A1 | * | 5/2007 | Tran | A61H 33/028 4/541.5 |
| 2010/0018808 | A1 | * | 1/2010 | Gloge | F16H 61/0031 184/6.12 |
| 2011/0114341 | A1 | | 5/2011 | Claffey et al. | |
| 2012/0205302 | A1 | * | 8/2012 | Palmer | E04H 4/12 248/346.03 |
| 2013/0092261 | A1 | * | 4/2013 | Andersson | F16K 15/063 137/511 |
| 2014/0119946 | A1 | * | 5/2014 | Boese | F04B 49/06 417/2 |
| 2014/0277777 | A1 | | 9/2014 | Potucek | |
| 2016/0363228 | A1 | * | 12/2016 | Hallisey | F16K 11/052 |
| 2018/0372233 | A1 | * | 12/2018 | Jaskiewicz | F16K 15/023 |
| 2019/0032351 | A1 | * | 1/2019 | Huang | E04H 4/169 |
| 2022/0325827 | A1 | * | 10/2022 | Wang | E04H 4/12 |

* cited by examiner

CONTROL BOX OF MASSAGE POOL AND MASSAGE POOL

CROSS-REFERENCE TO RELATED APPLICATION(S)

This Application claims priority from Chinese Application CN202120489220.0 filed on Mar. 8, 2021, the disclosure of which is incorporated herein by reference in its entirety.

BACKGROUND

1. Technical Field

Apparatuses and methods consistent with example embodiments relate to massage pools, and more specifically to a control box of a massage pool and a massage pool comprising the control box.

2. Background Art

A massage pool is may be controlled by a control box used to implement any of various water circulation functions. The water circulation functions may include water circulation functions and water massage functions. A water conduit for filtration of water in a water circulation system may be independent from a water conduit for water in a water massage system.

SUMMARY

Example embodiments may address at least the above problems and/or disadvantages and other disadvantages not described above. Also, example embodiments are not required to overcome the disadvantages described above, and may not overcome any of the problems described above.

One or more example embodiments may provide a control box of a massage pool and a massage pool comprising the control box.

According to an aspect of an example embodiment, a control box of a massage pool, comprises: a filtering pump unit comprising: a filtering pump body, a filtering water inlet pipe connected between the massage pool and the filtering pump body, and a filtering output pipe; a massage pump unit, the massage pump unit comprising: a massage pump body, a massage inlet pipe connected between the massage pool and the massage pump body, and a massage output pipe; a water outlet pipe configured to output water to the massage pool; a three-way connecting pipe fitting comprising: a first branch pipe having a distal end connected to the filtering output pipe, a second branch pipe having a distal end connected to the massage output pipe, and a third branch pipe having a distal end connected to the water outlet pipe; and at least one valve configured to alternately open and close a first flow path from the filtering output pipe through the first branch pipe.

The at least one valve may be a first swing check one-way valve comprising a first pivot shaft, a first valve clack pivotable around the first pivot shaft, and a first valve seat.

The at least one valve may be disposed in at least one of the filtering output pipe, the massage output pipe, and the three-way connecting pipe fitting; and the at least one valve may be configured to alternately open the first flow path and open a second flow path from the massage output pipe through the second branch pipe.

The at least one valve may comprise: a first swing check one-way valve disposed at a connection between the filtering output pipe and the first branch pipe; and a second swing check one-way valve disposed at a connection between the massage output pipe and the second branch pipe.

The first swing check one-way valve may be disposed at a connection between the filtering output pipe and the first branch pipe.

The at least one valve may be a lift valve comprising: a valve stem, a valve clack capable of reciprocating along the valve stem, and a valve seat.

A height at which the water outlet pipe is disposed may be greater than or equal to heights at which the filtering output pipe, the massage output pipe, and the three-way connecting pipe fitting are disposed.

The control box may further comprise an air pump unit comprising an air pump body and an air pump output pipe, the air pump output pipe configured to be connected to an air inlet conduit of the massage pool.

The control box may further comprise a heater connected to the filtering output pipe.

According to an aspect of another example embodiment, a massage pool may be provided comprising the control box as described above.

According to an aspect of another example embodiment, a control box of a massage pool is provided, the control box comprising: a filtering pump unit comprising a filter inlet pipe, a filtering pump, and a filtering output pipe; a massage pump unit comprising a massage inlet pipe, a massage pump, and a massage output pipe; a three-way connecting pipe; a water outlet pipe; and at least one valve; wherein the three-way connecting pipe comprises: a first branch pipe having a distal end connected to the filtering output pipe and a proximal end connected to a juncture of the three-way connecting pipe; a second branch pipe having a distal end connected to the massage output pipe and a proximal end connected to the juncture; and a third branch pipe having a distal end connected to the water outlet pipe and a proximal end connected to the juncture; wherein the at least one valve is configured to alternately open and close a first flow path comprising the filtering output pipe, the first branch pipe, and the juncture.

BRIEF DESCRIPTION OF THE DRAWINGS

The above and/or other aspects will become apparent and more readily appreciated from the following description of example embodiments, taken in conjunction with the accompanying drawings in which.

and

Figure 12:
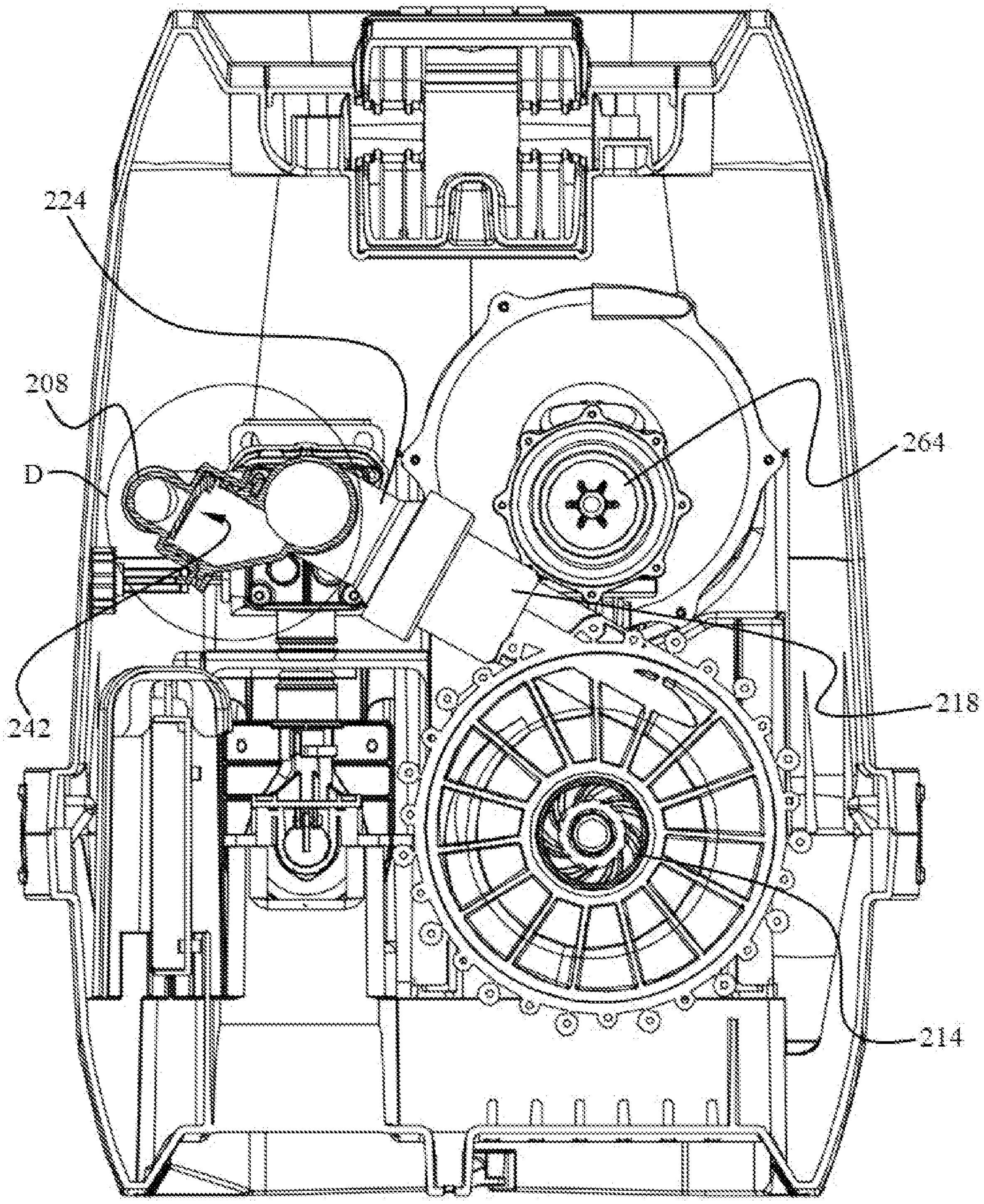
FIG. 12 is a schematic sectional view of the control box of FIG. 9 in a massage mode.
Figure 13:
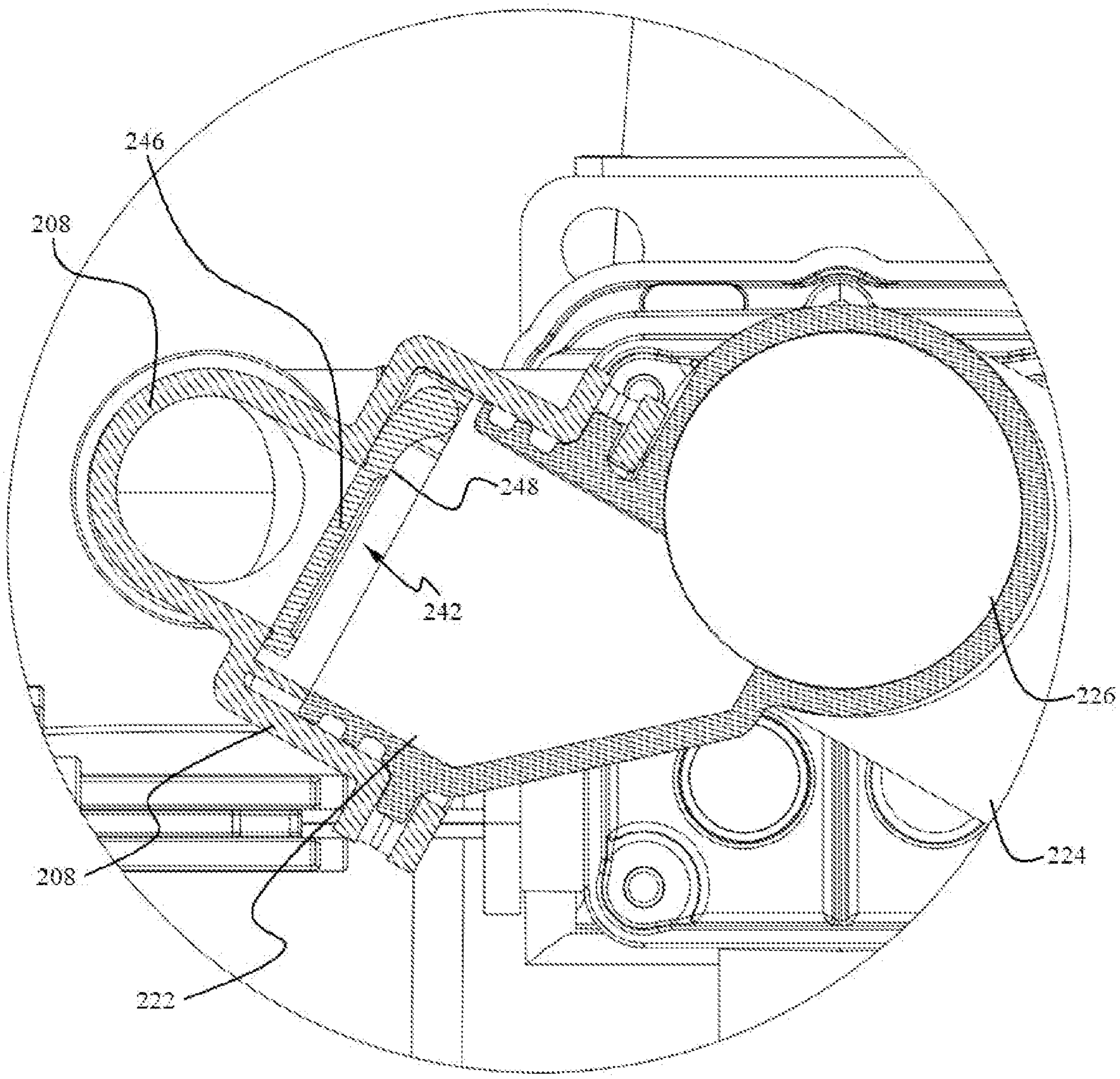

FIG. 13 is a partial enlarged view of part D of FIG. 12.

DETAILED DESCRIPTION

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list. In addition, the terms such as "unit," "-er (-or)," and "module" described in the specification refer to an element for performing at least one function or operation, and may be implemented in hardware, software, or the combination of hardware and software.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

Figure 1:
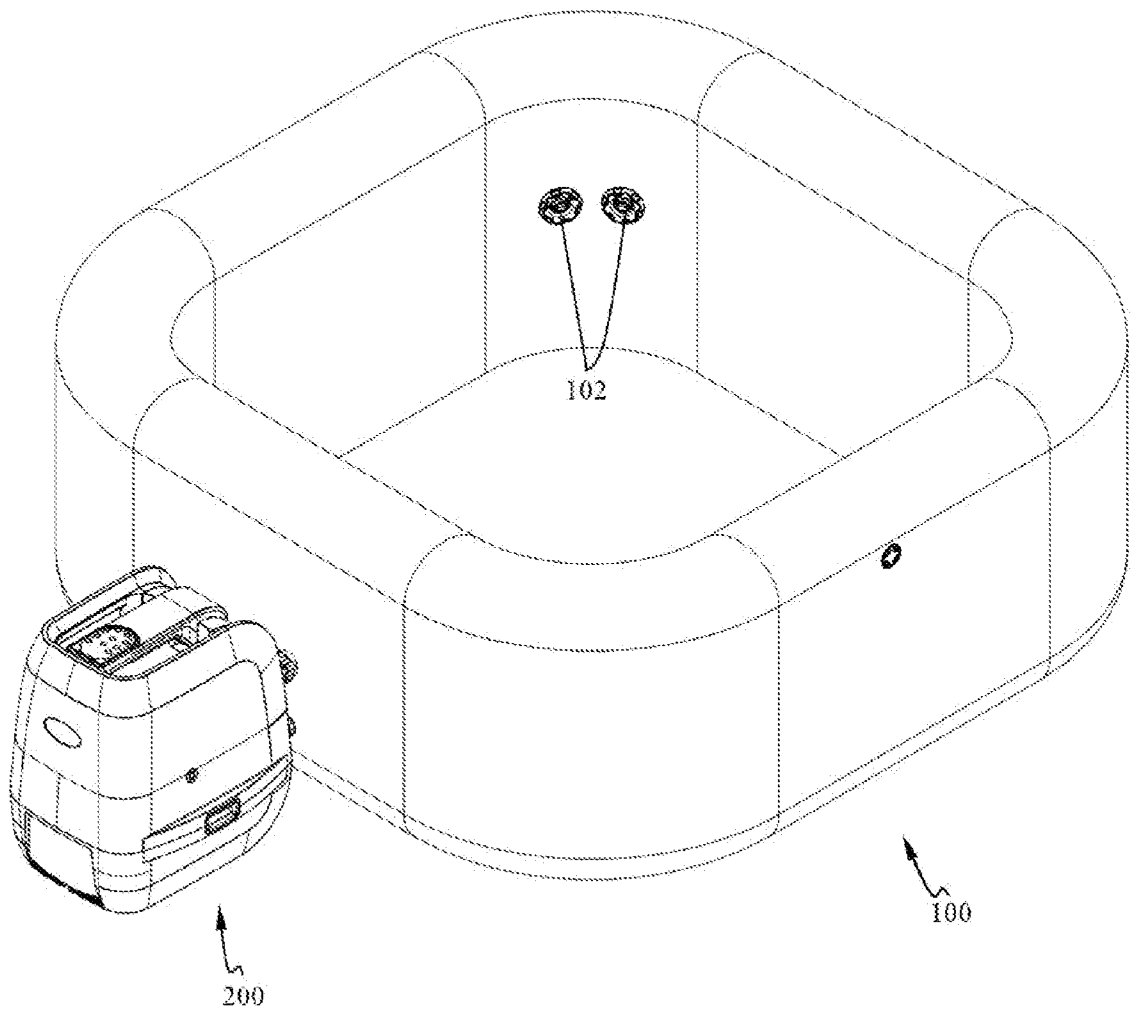
FIG. 1 is a schematic diagram of a massage pool and a control box according to an example embodiment.

FIG. 1 illustrates a schematic diagram of a massage pool 100 and a control box 200 according to an example embodiment. The control box 200 is connected to the massage pool 100. One or more massage nozzles 102 are provided on an inner wall of the massage pool 100.

As discussed herein, an inlet flow direction and an outlet flow direction of water represented by "inlet" in "a filtering water inlet pipe" and "a massage water inlet pipe" and "outlet" in "a water outlet pipe" are described with respect to the control box. That is, a flow direction from the massage pool 100 to the control box is described as an "inlet" direction, and a flow direction from the control box 200 to the massage pool 100 is described as an "outlet" direction.

Figure 2:
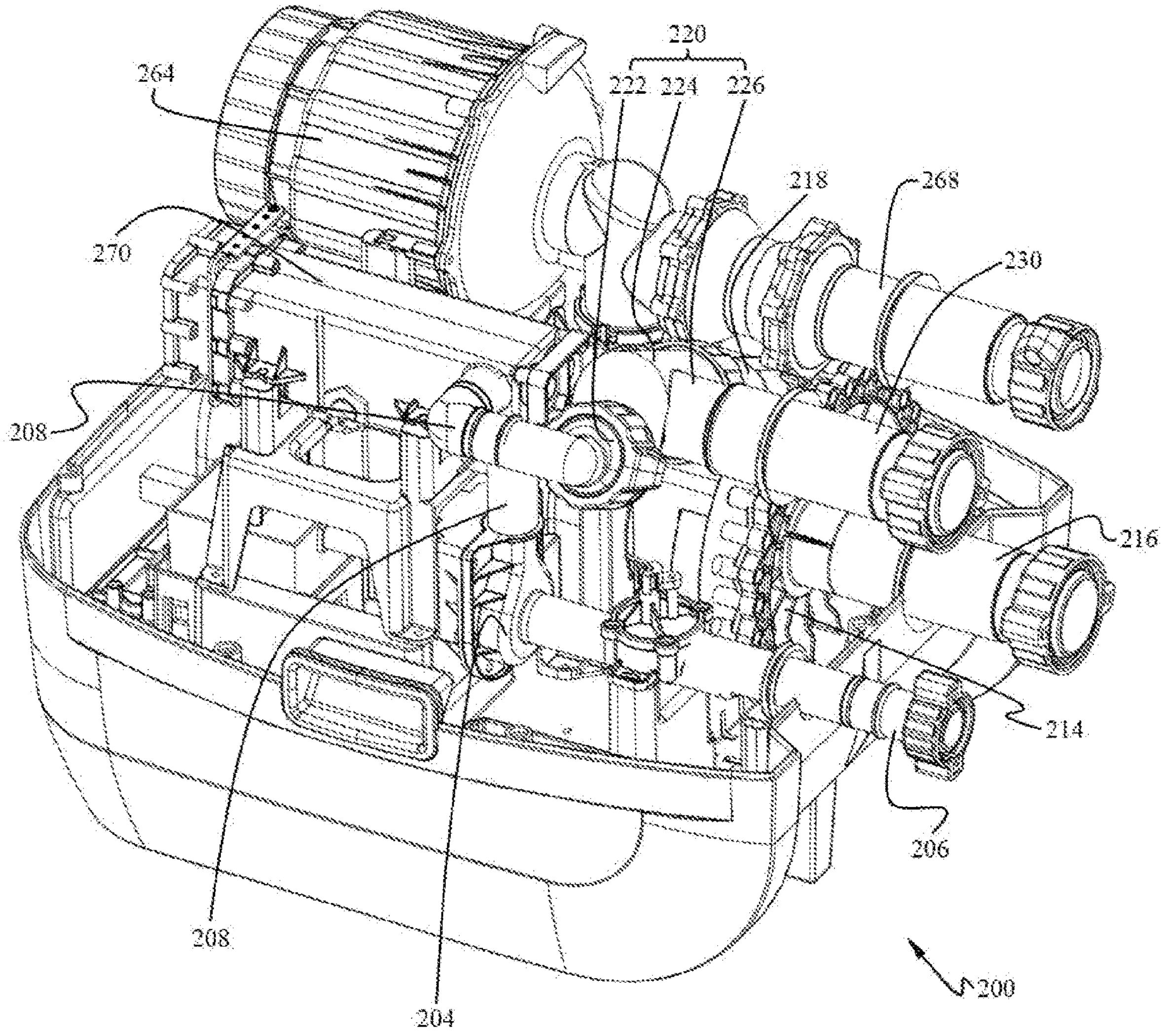
FIG. 2 is a partial schematic diagram of a control box according to an example embodiment.

With reference to FIG. 2, when the control box 200 is set to a filtering mode, a filtering water pump unit in the control box 200 operates, while a massage water pump unit in the control box does not operate. Water in the massage pool 100 flows from the massage pool 100 into a filtering water pump body 204 through a the filtering water inlet pipe 206; is pumped by the filtering water pump body 204 to a filtering output pipe 208; and then flows back to the massage pool 100 via a water outlet pipe 230. A first flow path is defined as starting at an end of the filtering output pipe close to the filtering water pump body and ending at a connection between a first branch pipe and a second branch pipe or a third branch pipe.

When the control box 200 is set to a massage mode, the massage water pump unit in the control box 200 operates, and the filtering water pump unit in the control box does not operate. Water in the massage pool 100 flows from the massage pool 100 into a massage water pump body 214 through a massage water inlet pipe 216; is pumped by the massage water pump body 214 to a massage outlet pipe 218, then flows back to a water conduit provided in the massage pool 100 via the water outlet pipe 230; and is ejected from the massage nozzle 102. A water conduit path is defined as starting at an end of the massage output pipe close to the massage water pump body, and ending at a connection between the second branch pipe and the third branch pipe.

It should be noted that in the filtering mode and massage mode described above, water passes through a third branch pipe 226 after being pumped from the filtering water pump body 204 or the massage water pump body 214, and then flows back to the massage pool 200 via the water outlet pipe 230 connected to the third branch pipe 226. In one or more example embodiments, because a water conduit in the filtering water pump unit is in communication with a water conduit in the massage water pump unit, to avoid an undesired flow splitting of water caused by water conduits in communication in various running modes, a valve may be provided inside the control box 200. The valve may be used for guiding a flow direction of water.

Figure 3:
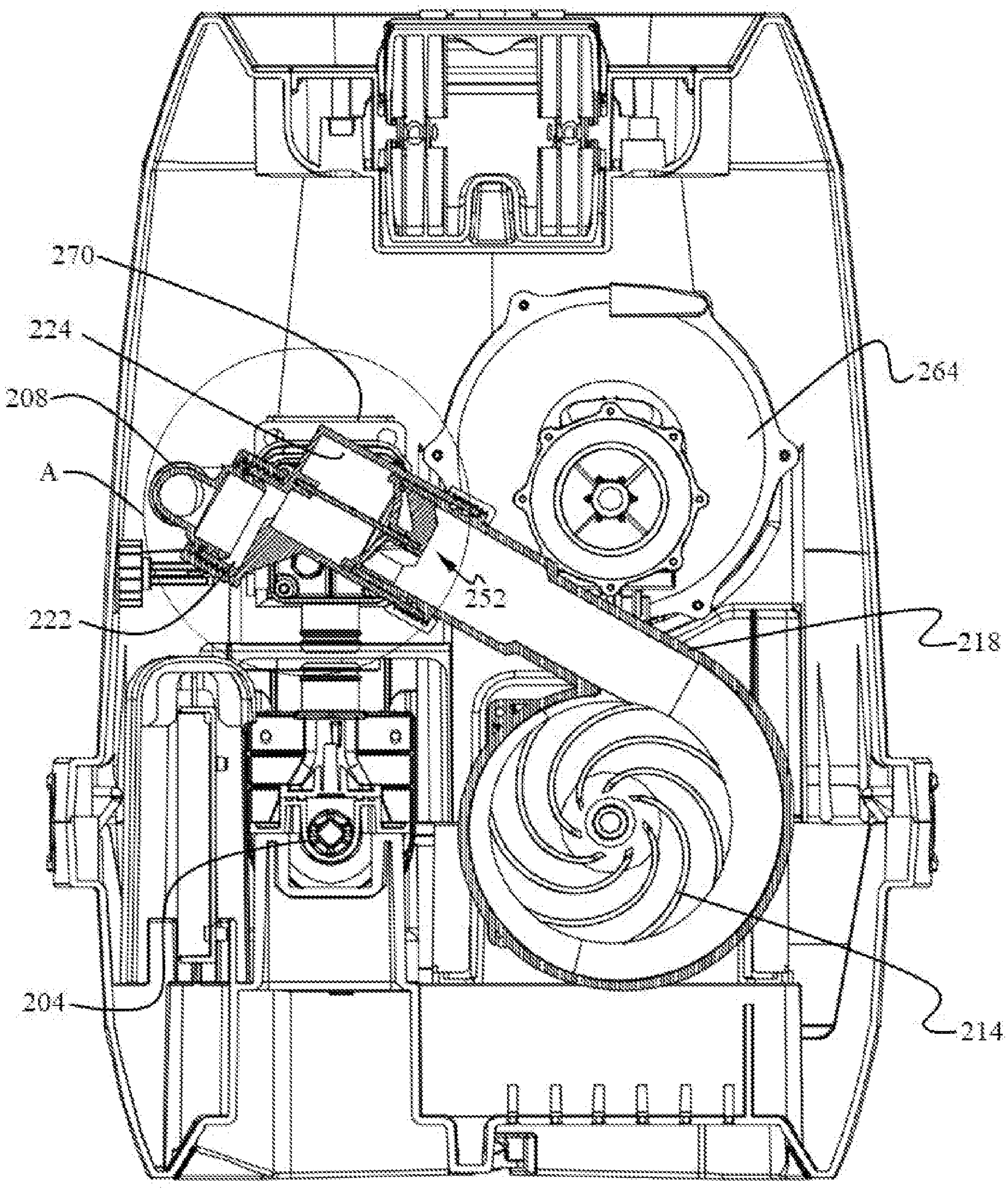
FIG. 3 is a schematic sectional view of the control box of FIG. 2 in a filtering mode.

With reference to FIGS. 2 and 3, a partial schematic diagram of a control box 200 according to an example embodiment is shown. FIG. 2 shows a filtering water pump unit, a massage water pump unit, a three-way connecting pipe fitting 220, a water outlet pipe 230, an air pump body 264, a positive temperature coefficient (PTC) heater 270, and other elements described below. In FIG. 2, the filtering water pump unit comprises: a filtering water inlet pipe 206, a filtering water pump body 204 connected to the filtering water inlet pipe 206, and a filtering output pipe 208 connected to the filtering water pump body 204. The filtering water inlet pipe 206 extends in a horizontal direction outside a housing of the control box. The massage water pump unit comprises: a massage water inlet pipe 216, a massage water pump body 214 connected to the massage water inlet pipe 216, and a massage output pipe 218 connected to the massage water pump body 214. The massage water inlet pipe 216 extends in the horizontal direction outside the housing of the control box. The three-way connecting pipe fitting 220 comprises: a first branch pipe 222 connected to the filtering output pipe 208; a second branch pipe 224 connected to the massage output pipe 218; and a third branch pipe 226 connected to the water outlet pipe 230. Thus, the first branch pipe 222 has a distal end connected to the filtering output pipe 208, and a proximal end connected to the a juncture of the second branch pipe 224, where the third branch pipe 226 is connected to the second branch pipe 224. The second branch pipe 224 has a distal end connected to the massage output pipe 218, and a juncture at a proximal end, where the third branch pipe 226 and the first branch pipe 222 are connected to the second branch pipe 224. The third branch pipe 226 has a distal end connected to the water outlet pipe and a proximal end connected to the juncture in the second branch pipe 224. In the example embodiment shown in FIG. 2, the first branch pipe 222 is staggered downward from the second branch pipe 224, and the third branch pipe 226 is connected to the second branch pipe 224. This enables the water outlet pipe 230 to be disposed above the filtering output pipe 208 and the massage output pipe 218. The water outlet pipe 230 is used for connecting to a water inlet conduit of the massage pool. One end of the water outlet pipe 230 is joined to the third branch pipe 226, and the other end extends in the horizontal direction outside the housing of the control box. The air pump unit comprises an air pump output pipe 268, extending in the horizontal direction, and an air pump body 264. The PTC heater 270 is disposed in a substantially horizontal position and is connected to the filtering output pipe 208.

As discussed above, the first branch pipe 222 of the three-way connecting pipe fitting 220 in FIG. 2 is staggered downward from the second branch pipe 224. This enables the third branch pipe 226, connected to the second branch pipe 224 at the juncture in the second branch pipe 224, to be disposed at a height greater than or equal to heights at which the first branch pipe 222 and the second branch pipe 224 are disposed. It is further arranged that the water outlet pipe 230 is disposed at a height that is greater than or equal to heights at which the filtering output pipe 208, the massage output pipe 218, and the three-way connecting pipe fitting 220 are disposed. That is, none of the heights at which other water conduits in the control box are disposed is greater than the height at which the water outlet pipe 230 is disposed. This example arrangement enables the control box to have a compact structure and an appropriate layout, and may aid in preventing air from remaining in a water conduit of the control box 200 due to low density. In addition, air may further be prevented from remaining at the PTC heater to cause the PTC heater to fail to detect water temperature as expected.

In one or more example embodiments, the foregoing air pump unit may be omitted from the control box.

In one or more example embodiments, the foregoing PTC heater may be omitted from the control box. In this case, the filtering output pipe 208 may be directly connected to the first branch pipe 222 of the three-way connecting pipe fitting 220 and the filtering water pump body 204.

Figure 4:
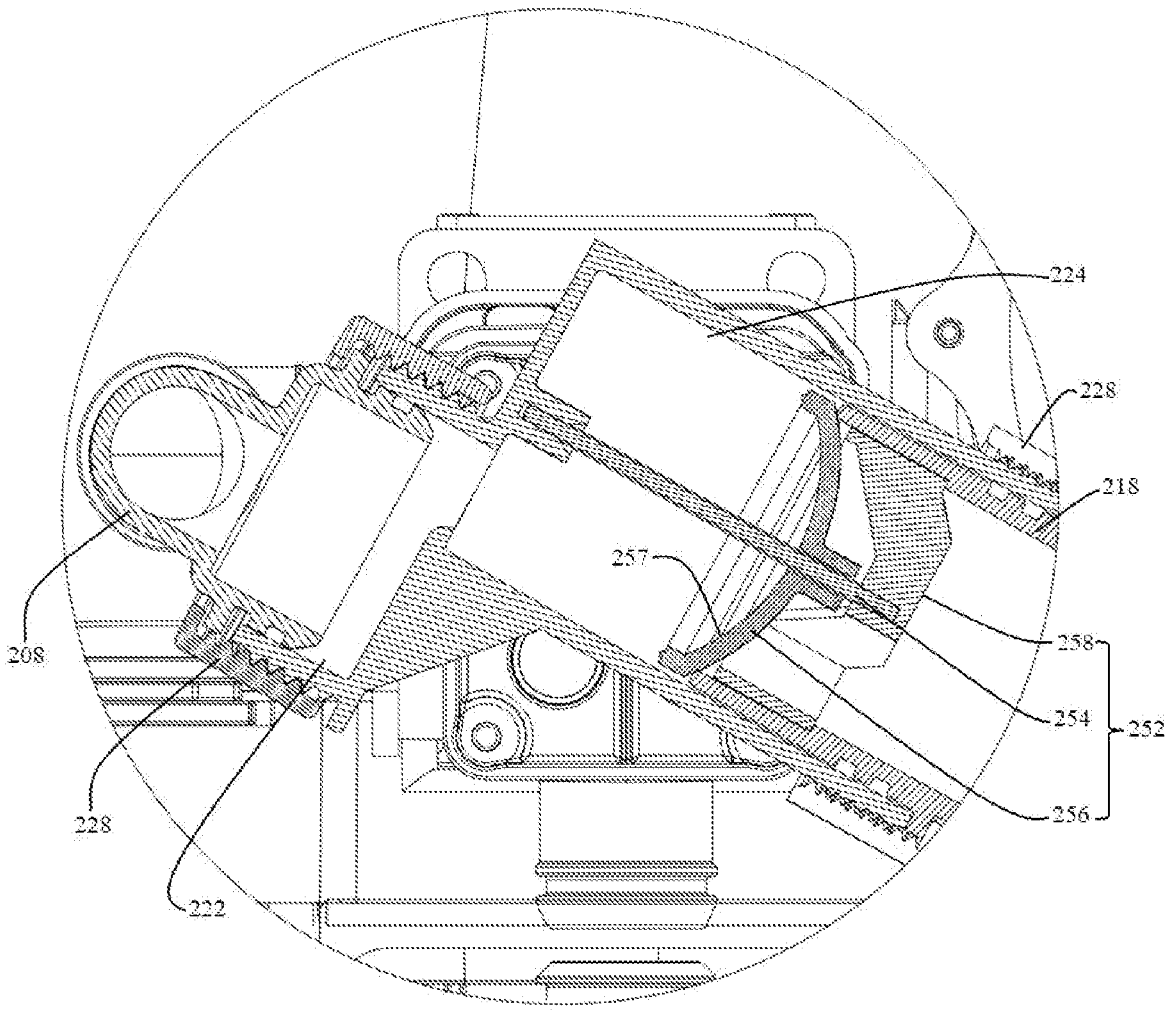
FIG. 4 is a partial enlarged view of part A of FIG. 3.

With reference to FIG. 3 to FIG. 7, FIG. 3 and FIG. 4 show a control box 200 in a filtering mode according to an example embodiment. With reference to FIG. 3 and FIG. 4, the filtering output pipe 208 and the massage output pipe 218 are respectively connected to the first branch pipe 222 and the second branch pipe 224 of the three-way connecting pipe fitting 220 by detachable threaded connecting members 228. A lift valve 252 is provided at the juncture of the second branch pipe 224, where the third branch pipe 226 is connected to the second branch pipe 224. The lift valve 252 is configured to alternately allow water flow from the first branch pipe 222 into the juncture of the second branch pipe 222 and into the third branch pipe 224, or to allow water flow from the massage output pipe 218 into the distal end of the second branch pipe into the juncture of the second branch pipe 222 and into the third branch pipe 224. The lift valve 252 comprises: a valve stem 254, a second valve clack 256 capable of reciprocating along the valve stem 254, and a second valve seat 258 for fixing the valve stem 254. In the filtering mode, the filtering water pump unit is in operation, and water from the massage pool 100 is pumped by the filtering water pump body 204, sequentially flows through the filtering output pipe 208 and the first branch pipe 222, and applies a force to a first surface 257 of the second valve clack 256. This force enables the second valve clack 256 to fall along the valve stem 254 to the second valve seat 258, to open a first flow path and at the same time to close a second flow path. Water from the first branch pipe 222 flows to the juncture in the second branch pipe 224, sequentially flows through the third branch pipe 226 and the water outlet pipe 230, and finally flows back into the massage pool 100.

Figure 5:
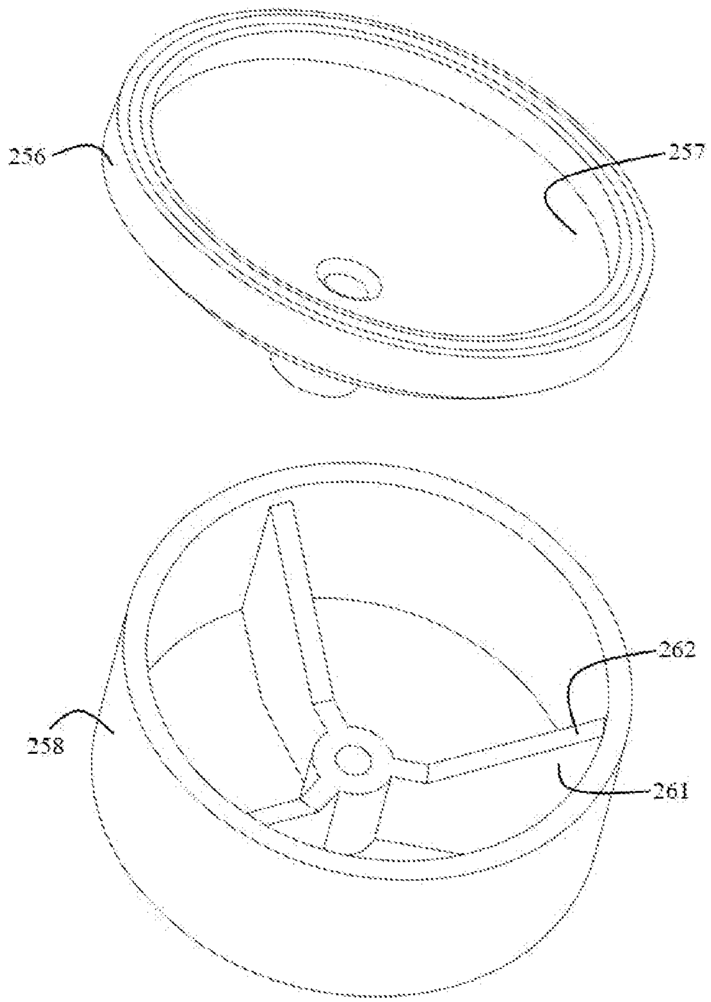
FIG. 5 is a partial schematic structural diagram of a lift valve of FIG. 3.

As shown in FIG. 5, in an example embodiment, the second valve clack 256 has an arc-shaped surface enabling the first surface 257 to form a concave surface toward the second valve seat 258. The second valve seat 258 has a hollow cylindrical structure with three uniformly distributed spokes 261. End surfaces 262 of the three spokes 261 of the second valve seat 258 are inwardly concave. That is, the second valve seat 258 has a concave surface. The concave surface can adapt to the second valve clack 256.

Figure 6:
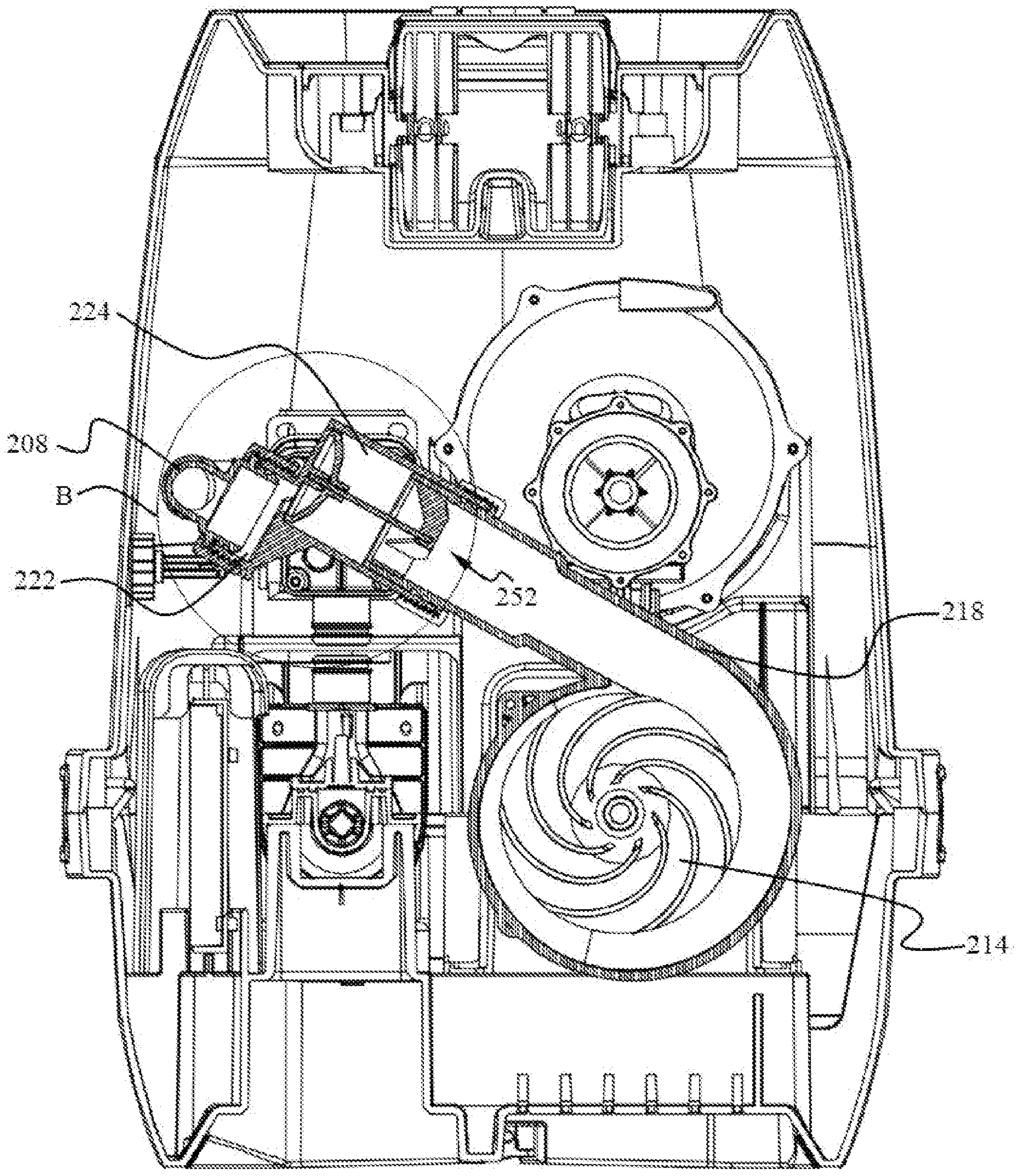
FIG. 6 is a schematic sectional view of the control box of FIG. 2 in a massage mode.
Figure 7:
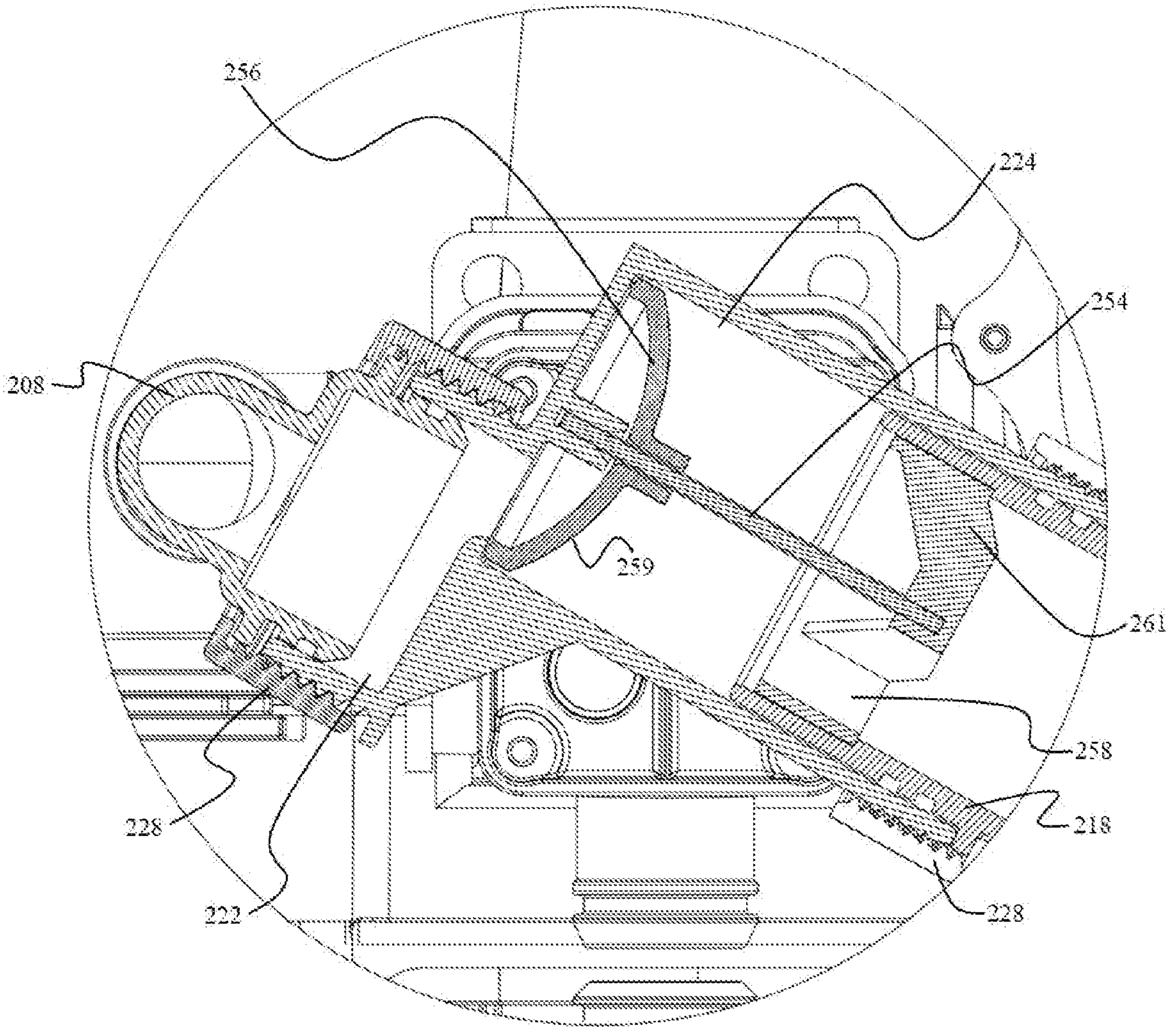
FIG. 7 is a partial enlarged view of part B of FIG. 6.

FIG. 6 and FIG. 7 show a control box in a massage mode according to an example embodiment. In the massage mode, the massage water pump unit is in operation, and water from the massage pool 100 is pumped by the massage water pump body 214 into the massage output pipe 218, and applies a force to a second surface 259 of the second valve clack 256. This force enables the second valve clack 256 to rise along the valve stem 254 to a joint between the first branch pipe 222 and the second branch pipe 224, to open the second flow path, and at the same time, close the first flow path. Water from the massage output pipe 218 flows into the juncture in the second branch pipe 224, sequentially flows through the third branch pipe 226 and the water outlet pipe 230, then flows to a water conduit provided in the massage pool 100, and is finally ejected from the massage nozzle 102.

With the foregoing arrangement, the lift valve 252 alternatively opens the first flow path for the filtered water or the second flow path for the massage water.

Figure 8:
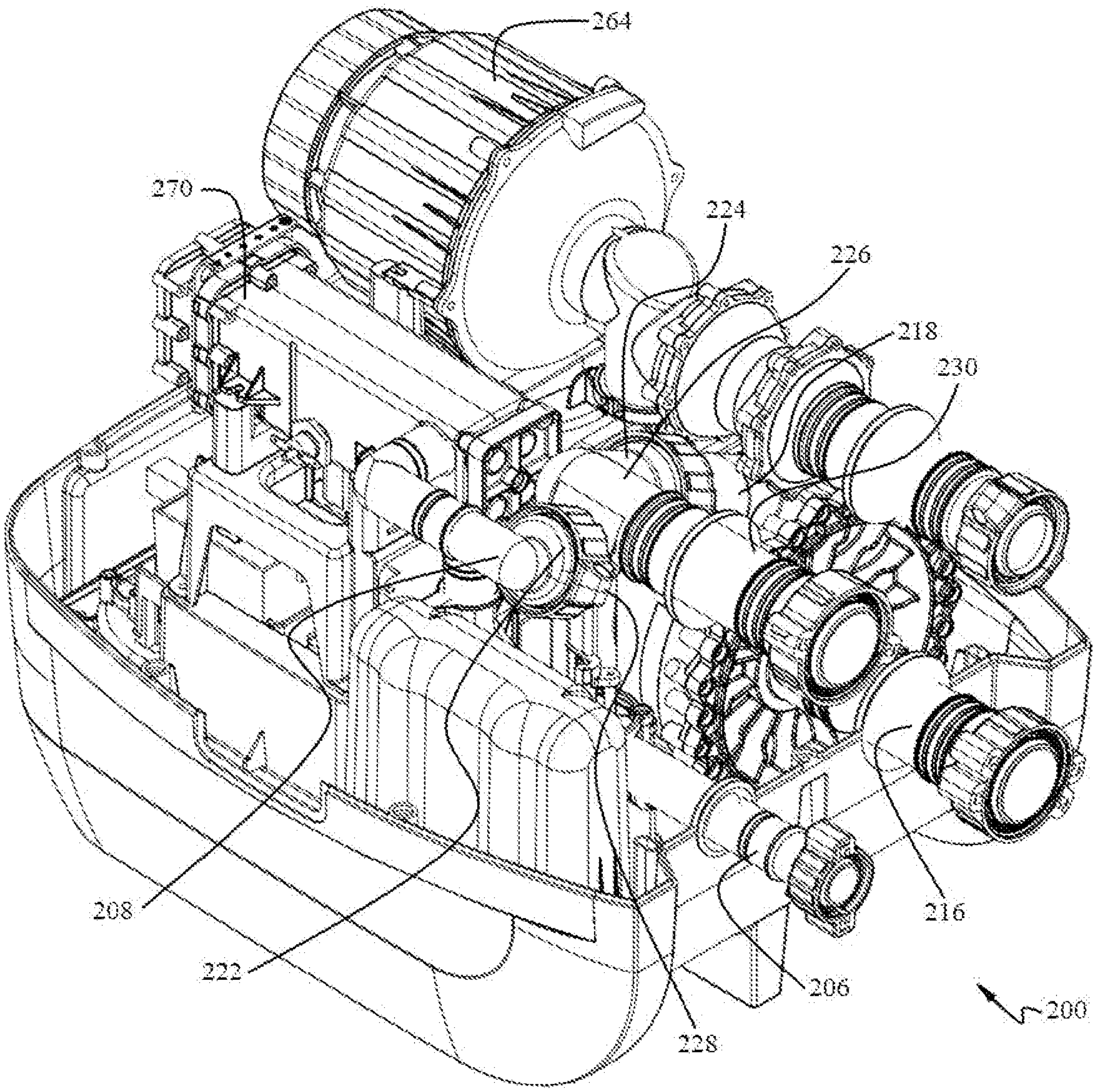
FIG. 8 is a partial schematic diagram of a control box according to another exemplary embodiment.

FIG. 8 shows a partial schematic diagram of a control box according to another example embodiment. Elements which are the same as those discussed with reference to FIG. 2 are not repeatedly-discussed here. In FIG. 8, the first branch pipe 222 of the three-way connecting pipe fitting 222 is staggered down from the third branch pipe 226, to enable a height at which the third branch pipe 226, connected to the juncture of the second branch pipe 224, is disposed to be greater than or equal to heights at which the first branch pipe 222 and the second branch pipe 224 are disposed. A height at which the water outlet pipe 230 is disposed is greater than or equal to heights at which the filtering output pipe 208, the massage output pipe 218, and the three-way connecting pipe fitting 220 are disposed. That is, none of the heights at which other water conduits in the control box are disposed are greater than the height at which the water outlet pipe 230 is disposed. The filtering output pipe 208 and the massage output pipe 218 are respectively connected to the first branch pipe 222 and the second branch pipe 224 by the detachable threaded connecting members 228.

Figure 9:
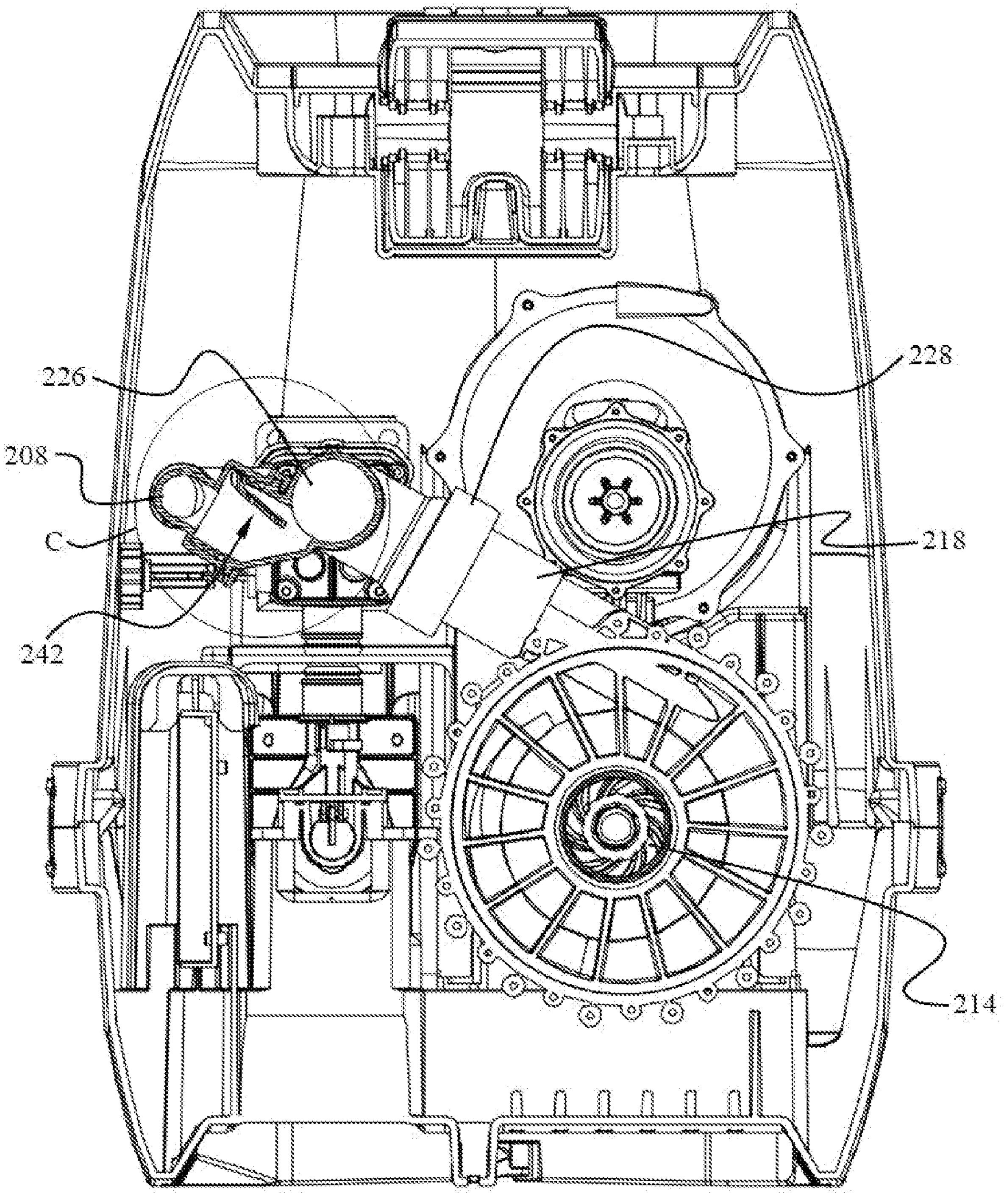
FIG. 9 is a schematic sectional view of a control box in a filtering mode according to another example embodiment.
Figure 10:
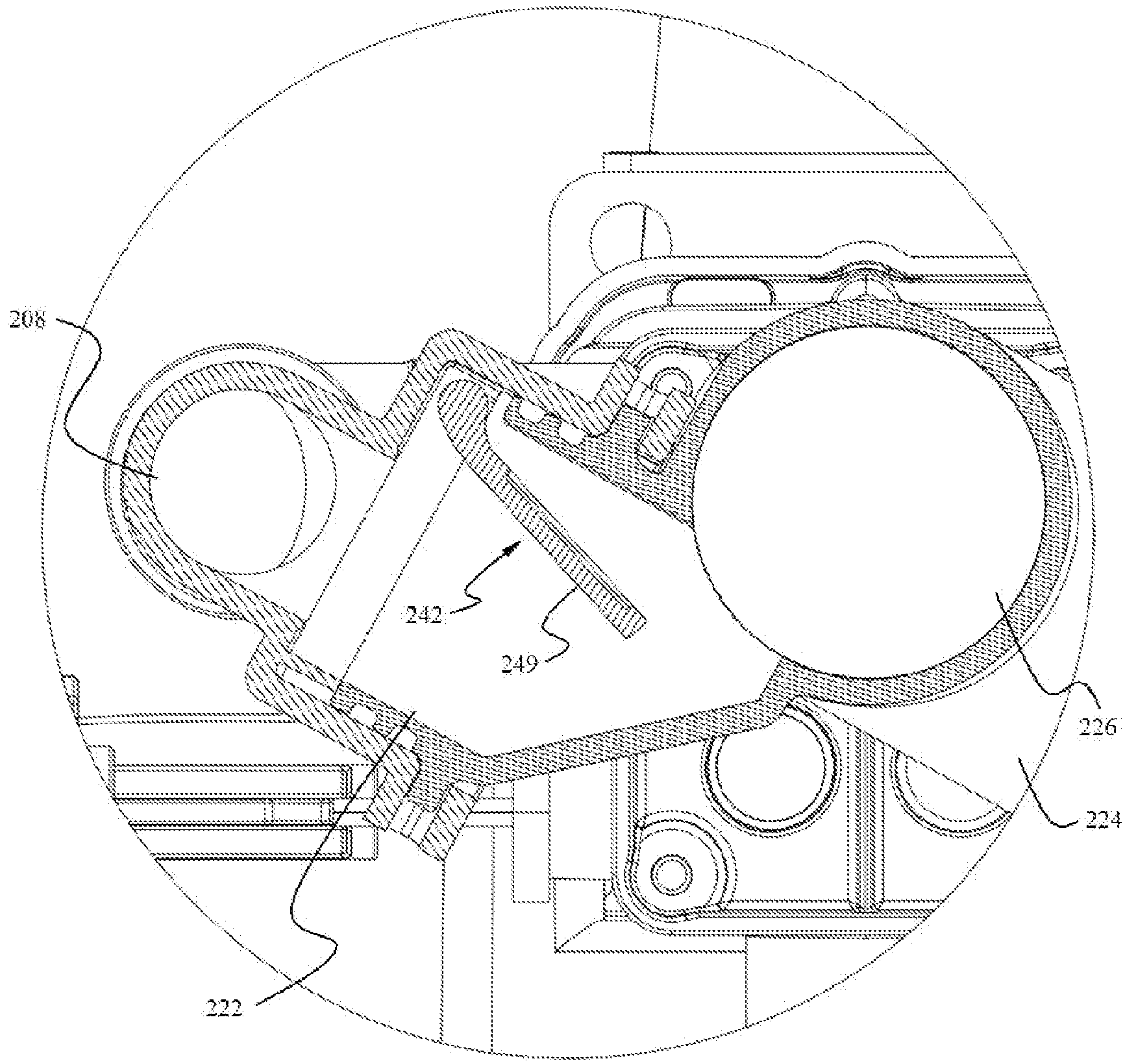
FIG. 10 is a partial enlarged view of part C of FIG. 9.
Figure 11:
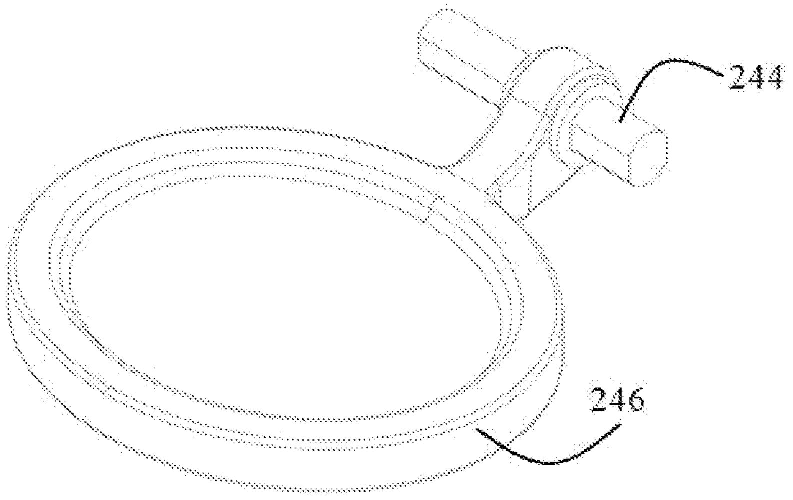
FIG. 11 is a partial schematic structural diagram of a first swing check one-way valve of FIG. 9.

With reference to FIG. 9 to FIG. 13, FIG. 9 and FIG. 10 show a control box in a filtering mode according to another example embodiment. With reference to FIG. 9 and FIG. 10, the filtering output pipe 208 is connected to the first branch pipe 222 in a pluggable manner. The massage output pipe 218 is connected to the second branch pipe 224 by the detachable threaded connecting member 228. A first swing check one-way valve 242 is provided at the distal end of the first branch pipe 222, at the connection between the first branch pipe 222 and the filtering output pipe 208. As illustrated, the first swing check one-way valve 242 is arranged at the filtering output pipe 208. With reference to FIG. 10 and FIG. 11, the first swing check one-way valve

242 comprises: a first pivot shaft 244, a first valve clack 246 pivotable around the first pivot shaft 244, and a first valve seat. The first valve clack 246 is adapted to the filtering output pipe 208, and is pivotably connected to the first pivot shaft 244. The first pivot shaft 244 is pivotably or fixedly connected to the filtering output pipe 208 by the first valve seat (not shown). In the filtering mode, the filtering water pump unit is in operation, and water from the massage pool 100 is pumped by the filtering water pump body 204 to the filtering output pipe 208, and applies a force to a third surface 249 of the first valve clack 246. This force enables the first valve clack 246 to pivot around the first pivot shaft 244 and to be open, to open the first flow path. Water from the filtering output pipe 208 sequentially flows into the first branch pipe 222, the third branch pipe 226, and the water outlet pipe 230, and finally flows back to the massage pool 100. It should also be noted that some water is diverted by the third branch pipe 226 to flow into the second branch pipe 224, and continues to flow to the massage output pipe 218. That is, some of the water is diverted onto the second flow path to flow to the massage output pipe 218.

FIG. 12 and FIG. 13 are schematic sectional views of the control box in FIG. 9 in a massage mode. In the massage mode, the massage water pump unit is in operation, and water from the massage pool 100 is pumped by the massage water pump body 214 to the massage output pipe 218, sequentially flows through the second branch pipe 224, the third branch pipe 226, and the water outlet pipe 230, flows to a water conduit provided in the massage pool 100, and is finally ejected from the massage nozzle 102. Some of the water flowing to the second branch pipe 224 is diverted to flow to the first branch pipe 222, and applies a force to a fourth surface 248 of the first valve clack 246 at a connection between the first branch pipe 222 and the filtering output pipe 208. This force enables the first valve clack 246 to pivot in an opposite direction around the first pivot shaft 244 to be closed, and to close the first flow path.

With the foregoing arrangement, the first swing check one-way valve 242 may open or close the first flow path.

According to one or more example embodiments, the first swing check one-way valve may be disposed at the connection between the first branch pipe and the filtering output pipe and may be arranged at the first branch pipe. According to one or more other example embodiments, the first swing check one-way valve may be disposed at the filtering output pipe along the first flow path.

According to one or more example embodiments, the first swing check one-way valve may be disposed as an auto-reset swing check one-way valve. In other words, when no water applies a force to the first swing check one-way valve, the first swing check one-way valve may automatically close to close the first flow path.

According to one or more example embodiments, to avoid unnecessary flow diversion of water in the filtering mode into the massage output pipe 218, while the first swing check one-way valve 242 is provided at a connection between the first branch pipe 222 and the filtering output pipe 208, a second swing check one-way valve may be further provided at the massage output pipe. Similar to the structure of the first swing check one-way valve 242, the second swing check one-way valve may include a second pivot shaft, a third valve clack pivotable around the second pivot shaft, and a third valve seat. The third valve clack may be adapted to the massage output pipe 218, and be pivotably connected to the second pivot shaft. The second pivot shaft may be pivotably or fixedly connected to the massage output pipe by the third valve seat.

According to one or more example embodiments, the filtering water pump unit is in operation in the filtering mode, and water from the massage pool 100 is pumped by the filtering water pump body 204 to the filtering output pipe 208, and the water applies a force to the third surface 249 of the first valve clack 246. This force enables the first valve clack 246 to pivot around the first pivot shaft 244 to be open, to open the first flow path. Water from the filtering output pipe 208 sequentially flows through the first branch pipe 222, the third branch pipe 226, and the water outlet pipe 230, and finally flows back to the massage pool 100. It should also be noted that, meanwhile, some water may be undesirably diverted, via the third branch pipe 226, along the second flow path to flow to the massage output pipe 218. In this case, water flows through the second swing check one-way valve, and applies a force to a sixth surface of the third valve clack of the second swing check one-way valve, to enable the third valve clack to pivot in an opposite direction around the second pivot shaft to be closed, to close the second flow path. In other words, in the filtering mode in this example embodiment, the first valve clack 246 is opened to open the first flow path, and at the same time the third valve clack is closed to close the second flow path.

Similarly, in the massage mode in one or more example embodiments, water flows through the second swing check one-way valve, and applies a force to a fifth surface of the third valve clack of the second swing check one-way valve, to enable the third valve clack to pivot around the second pivot shaft to be open, to open the second flow path. Water from the massage output pipe 208 sequentially flows through the second branch pipe, the third branch pipe, and the water outlet pipe, then flows to the water conduit provided in the massage pool 100, and is finally ejected from the massage nozzle 102. It should also be noted that, meanwhile, some water is diverted, via the third branch pipe, along the first flow path to flow to the filtering output pipe. In this case, water flows through the first swing check one-way valve, and applies a force to a fourth surface of the first valve clack, to enable the first valve clack to pivot in an opposite direction around the first pivot shaft to be closed, to close the first flow path. In other words, in the massage mode in this example embodiment, the third valve clack is opened to open the second flow path, and at the same time the first valve clack is closed to close the first flow path.

With the foregoing example arrangement, the first swing check one-way valve and the second swing check one-way valve cooperate with each other to alternatively open the first flow path or the second flow path.

According to one or more example embodiments, the first swing check one-way valve may be disposed along the first flow path. For example, the first swing check one-way valve may be disposed at the filtering output pipe. Similarly, the second swing check one-way valve may be disposed along the second flow path. For example, the second swing check one-way valve may be disposed at the second branch pipe.

According to one or more example embodiments, the second swing check one-way valve may be disposed as an auto-reset swing check one-way valve. In other words, when no water applies a force to the second swing check one-way valve, the second swing check one-way valve is automatically closed to close the second flow path.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A control box of a massage pool, the control box comprising:

a filtering pump unit comprising: a filtering pump body, a filtering water inlet pipe connected between the massage pool and the filtering pump body, and a filtering output pipe;

a massage pump unit, the massage pump unit comprising: a massage pump body, a massage inlet pipe connected between the massage pool and the massage pump body, and a massage output pipe;

a water outlet pipe configured to output water to the massage pool at a height at which is greater than a height at which the filtering output pipe is configured to output water to the massage pool;

a three-way connecting pipe fitting comprising: a first branch pipe having a distal end connected to the filtering output pipe, a second branch pipe having a distal end connected to the massage output pipe, and a third branch pipe having a distal end connected to the water outlet pipe; and at least one valve configured to alternately open and close a first flow path from the filtering output pipe through the first branch pipe;

wherein, in a filtering mode, the filtering pump unit operates without the massage pump unit, and, in a massage mode, the massage pump unit operates without the filtering pump unit, such that the filtering pump unit operates independently from the massage pump unit.

2. The control box according to claim 1, wherein the at least one valve is a first swing check one-way valve comprising: a first pivot shaft, a first valve clack pivotable around the first pivot shaft, and a first valve seat.

3. The control box according to claim 1, wherein:

the at least one valve is disposed in at least one of the filtering output pipe, the massage output pipe, and the three-way connecting pipe fitting; and the at least one valve is configured to alternately open the first flow path and open a second flow path from the massage output pipe through the second branch pipe.

4. The control box according to claim 3, wherein the at least one valve comprises:

a first swing check one-way valve disposed at a connection between the filtering output pipe and the first branch pipe; and a second swing check one-way valve disposed at a connection between the massage output pipe and the second branch pipe.

5. The control box according to claim 2, wherein the first swing check one-way valve is disposed at a connection between the filtering output pipe and the first branch pipe.

6. The control box according to claim 3, wherein the at least one valve is a lift valve comprising: a valve stem, a valve clack capable of reciprocating along the valve stem, and a valve seat.

7. The control box according to claim 1, wherein the control box further comprises an air pump unit comprising an air pump body and an air pump output pipe, the air pump output pipe configured to be connected to an air inlet conduit of the massage pool.

8. The control box according to claim 1, further comprising a heater connected to the filtering output pipe.

9. A control box of a massage pool, the control box comprising:

a filtering pump unit comprising a filter inlet pipe, a filtering pump, and a filtering output pipe;

a massage pump unit comprising a massage inlet pipe, a massage pump, and a massage output pipe;

a water outlet pipe configured to output water to the massage pool at a height which is greater than a height at which the filtering output pipe is configured to output water to the massage pool;

a three-way connecting pipe comprising:

a first branch pipe having a distal end connected to the filtering output pipe and a proximal end connected to a juncture of the three-way connecting pipe;

a second branch pipe having a distal end connected to the massage output pipe and a proximal end connected to the juncture; and a third branch pipe having a distal end connected to the water outlet pipe and a proximal end connected to the juncture; and at least one valve configured to alternately open and close a first flow path comprising the filtering output pipe, the first branch pipe, and the juncture;

wherein, in a filtering mode, the filtering pump unit operates without the massage pump unit, and, in a massage mode, the massage pump unit operates without the filtering pump unit, such that the filtering pump unit operates independently from the massage pump unit.

10. A massage pool comprising:

an inner wall;

a plurality of massage nozzles provided on the inner wall; and a control box communicatively coupled to the plurality of massage nozzles, the control box comprising:

a filtering pump unit comprising: a filtering pump body, a filtering water inlet pipe connected between the massage pool and the filtering pump body, and a filtering output pipe;

a massage pump unit, the massage pump unit comprising: a massage pump body, a massage inlet pipe connected between the massage pool and the massage pump body, and a massage output pipe;

a water outlet pipe configured to output water to the massage pool at a height which is greater than a height at which the filtering output pipe is configured to output water to the massage pool;

a three-way connecting pipe fitting comprising: a first branch pipe having a distal end connected to the filtering output pipe, a second branch pipe having a distal end connected to the massage output pipe, and a third branch pipe having a distal end connected to the water outlet pipe; and at least one valve configured to alternately open and close a first flow path from the filtering output pipe through the first branch pipe;

wherein, in a filtering mode, the filtering pump unit operates without the massage pump unit, and, in a massage mode, the massage pump unit operates without the filtering pump unit, such that the filtering pump unit operates independently from the massage pump unit.

11. The massage pool according to claim 10, wherein the at least one valve is a first swing check one-way valve comprising:

a first pivot shaft, a first valve clack pivotable around the first pivot shaft, and a first valve seat.

12. The massage pool according to claim 10, wherein:
the at least one valve is disposed in at least one of the filtering output pipe, the massage output pipe, and the three-way connecting pipe fitting; and
the at least one valve is configured to alternately open the first flow path and open a second flow path from the massage output pipe through the second branch pipe.

13. The massage pool according to claim 12, wherein the at least one valve comprises:
a first swing check one-way valve disposed at a connection between the filtering output pipe and the first branch pipe; and
a second swing check one-way valve disposed at a connection between the massage output pipe and the second branch pipe.

14. The massage pool according to claim 11, wherein the first swing check one-way valve is disposed at a connection between the filtering output pipe and the first branch pipe.

15. The massage pool according to claim 12, wherein the at least one valve is a lift valve comprising: a valve stem, a valve clack capable of reciprocating along the valve stem, and a valve seat.

16. The massage pool according to claim 10, wherein a height at which the water outlet pipe is disposed is greater than or equal to heights at which the filtering output pipe, the massage output pipe, and the three-way connecting pipe fitting are disposed.

17. The massage pool according to claim 10, wherein the control box further comprises an air pump unit comprising an air pump body and an air pump output pipe, the air pump output pipe configured to be connected to an air inlet conduit of the massage pool.

18. The massage pool according to claim 10, further comprising a heater connected to the filtering output pipe.

* * * * *